United States Patent [19]
Sharpin et al.

[11] Patent Number: 5,285,209
[45] Date of Patent: Feb. 8, 1994

[54] ANGLE-OF-ARRIVAL MEASUREMENT VIA SPECTRAL ESTIMATION OF RADAR TIME-OF-ARRIVAL PERIODICITIES

[75] Inventors: David L. Sharpin, Springfield; James B. Y. Tsui, Dayton; Rudy L. Shaw, Huber Heights, all of Ohio

[73] Assignee: The United States of America as represented by the Secretary of the Air Force, Washington, D.C.

[21] Appl. No.: 53,758

[22] Filed: Apr. 29, 1993

[51] Int. Cl.$^5$ .......................... G01S 5/02; G01S 5/04
[52] U.S. Cl. ................... 342/424; 342/442; 342/13; 342/156
[58] Field of Search ............... 342/424, 433, 434, 156, 342/442, 196, 13

[56] References Cited
U.S. PATENT DOCUMENTS

| | | | |
|---|---|---|---|
| 4,209,835 | 6/1980 | Guadagnolo | 342/13 X |
| 4,438,439 | 3/1984 | Shreve | 342/449 |
| 4,500,884 | 2/1985 | Naubereit et al. | 342/456 |
| 4,593,286 | 6/1986 | Mathews et al. | 342/88 |
| 4,768,036 | 8/1988 | Litchford et al. | 342/455 |
| 4,888,593 | 12/1989 | Friedman et al. | 342/387 |
| 4,918,455 | 4/1990 | Maier | 342/13 |
| 4,992,796 | 2/1991 | Apostolos | 342/156 |
| 5,053,784 | 10/1991 | Hippelainen | 342/434 |
| 5,198,822 | 3/1993 | Brown | 342/424 |
| 5,237,333 | 8/1993 | Guard | 342/424 |

*Primary Examiner*—John B. Sotomayor
*Attorney, Agent, or Firm*—Bernard E. Franz; Thomas L. Kundert

[57] ABSTRACT

The method provides the capability to estimate the angle-of-arrival (AOA) of radar pulses with respect to a ground or airborne based platform. It utilizes a spectral estimation technique which extracts the periodic properties of radar signals whose time-of-arrivals (TOAs) have been tagged by an Electronic Warfare receiver. The method can be used in a multiple signal environment and can separate and individually measure AOA of emitters that are spatially very close but have incommensurate Pulse Repetition Intervals (PRIs).

1 Claim, 3 Drawing Sheets

ANGLE-OF-ARRIVAL MEASUREMENT VIA SPECTRAL ESTIMATION OF RADAR TIME-OF-ARRIVAL PERIODICITIES

RIGHTS OF THE GOVERNMENT

The invention described herein may be manufactured and used by or for the Government of the United States for all governmental purposes without the payment of any royalty.

BACKGROUND OF THE INVENTION

The present invention relates generally to an angle-of-arrival (AOA) measurement via spectral estimation of radar time-of-arrival periodicities.

Many techniques for estimating the AOA of radio waves inpinging an array of antennas have appeared in the literature. See for example A. Paulraj, R.Roy, T. Kailath, "Estimation of signal parameters via rotational invariance techniques - ESPRIT", Proc Nineteenth Asilomar Conf., Signals, Systems, Nov. 1985.

M. Wax, T.J. Shuan, T. Kailath, "Spatio-Temporal Spectral Analysis by Eigenstructure Methods", IEEE ASSP-32, No.4, August 1984, pp 817-827.

S. Kay, Modern Spectral Estimation, Prentice Hall Signal Processing Series, 1988.

A simple technique which uses a pair of antennas configured as shown in FIG. 1, is to measure the time-difference-of-arrival (TDOA) of a radar pulse. The TDOA for a signal at the two antennas is given by the following relationship.

$$TDOA = \left(\frac{d}{c}\right)\cos\theta \quad (1)$$

where d is the distance between the antennas, c is the speed of light and $\theta$ is the angle of incidence (See J.B.Y. Tsui, Microwave Receivers with Electronic Warfare Applications, John Wiley & Sons, 1986). Thus if the TOA of a pulsed signal can be measured very accurately, this information can be used to calculate the AOA. An EW receiver ustilizes a TOA circuit to time tag radar pulses. This unit typically consists of a threshold detector (which changes its output state upon detection of a video pulse from the receiver) and a high speed digital counter. The counter's count value is read into memory when the threshold detector's output state changes.

There are two problem with this approach: 1) If the EW receivers are exposed to a single stable pulse train then the TOA pulse trains for antennas 1 and 2 appear as shown in FIG. 2. The TDOA is estimated by taking the time difference between the undelayed or reference channel and the delayed channel. In practice many individual pulse trains are interleaved in time and each individual pulse train may be staggered or jittered in time. Under these conditions the simple time differencing scheme fails. 2) In many cases accurate single measurements of the TOA are difficult to make due to the finite rise time of the radar pulses. The TOA values from one measurement to another appear jittered. This is one of the reasons this approach has not been used for short baseline systems (see the Tsui text cited above). The invention presented herein provides a technique to use the TDOA measurement in a multiple signal environment and uses a set of TOA measurements over which an averaging process occurs.

The following U.S. patents are of interest.

U.S. Pat. Nos. 5,053,784 - Hippelainen
4,888,593 - Friedman et al
4,768,036 - Litchford et al
4,500,884 - Naubereit et al
4,438,439 - Shreve The closest patent is Naubereit which discloses an automatic aircraft carrier landing system in which an aircraft is guided to the carrier pitch and bank information from the carrier so as to indicate to the pilot of the aircraft whether he is within a prescribed flight path.

The Friedman et al patent relates to a direction finding method and apparatus for a radio signal source, modulated by a digital information signal and existing in a heavy interference environment. The direction finding technique exploits the second order periodicity of a transmitted signal having digital modulation. The signal time of arrival difference between two antennas is determined using a cyclic crosscorrelation method.

The Hippelainen, Litchford et al and Shreve patents are of less interest. None of the cited patents use a spectral estimation technique that extracts periodic Properties of radar signals whose time-of-arrivals have been tagged by an Electronic Warfare receiver.

SUMMARY OF THE INVENTION

An objective of the invention is to provide the capability to estimate the angle-of-arrival (AOA) of radar pulses with respect to a ground or airborne based platform.

The invention utilizes a spectral estimation technique which extracts the periodic properties of radar signals whose time-of-arrivals (TOAs) have been tagged by an Electronic Warfare receiver. The invention can be used in a multiple signal environment and can separate and individually measure AOA of emitters that are spatially very close but have incommensurate Pulse Repetition Intervals (PRIs).

DETAILED DESCRIPTION

Figure 1:
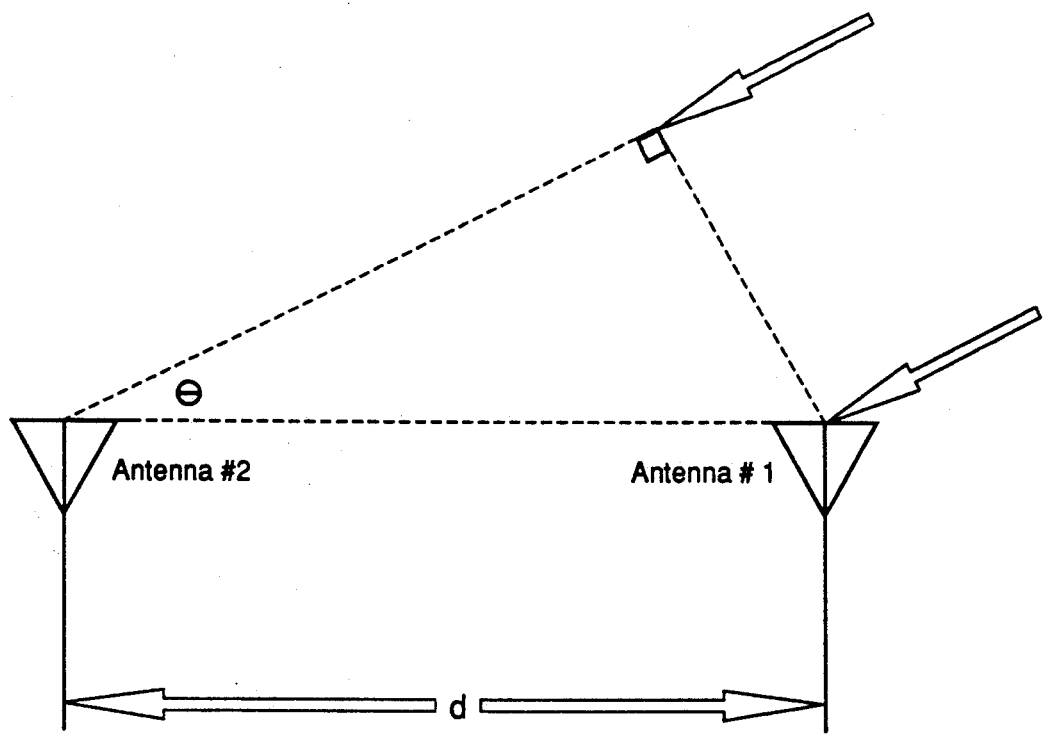
FIG. 1 is a diagram showing reception of a radar signal at two antennas.
Figure 2:
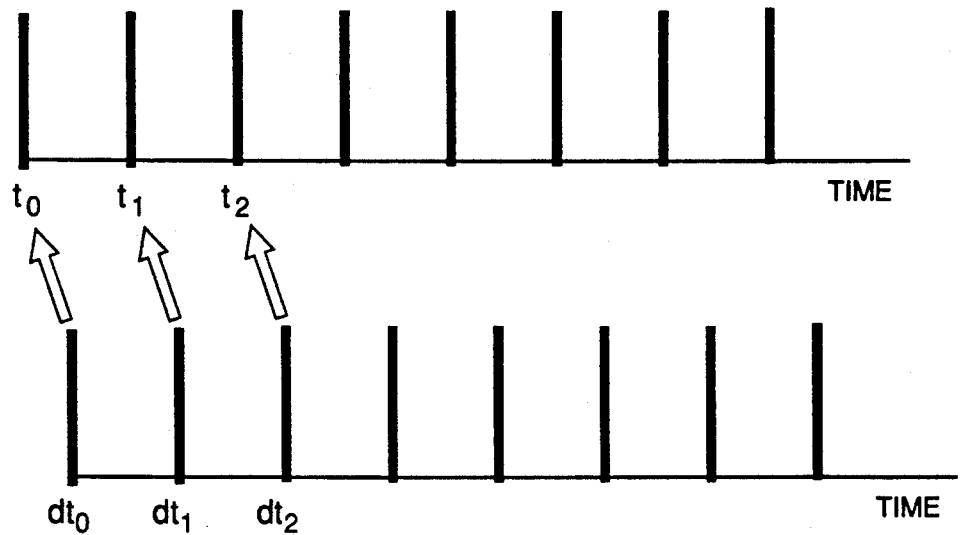
FIG. 2 is a graph showing a single signal TOA plot.

In a previous patent application (hereby incorporated by reference) by Tsui, Shaw and Sharpin for "Spectral Estimation of Radar Time-Of-Arrival Periodicities, SN 07/986,166 filed Dec. 3, 1992, it was shown that by making a slight modification to the Discrete Fourier Transform (DFT) equation, that the periodogram estimator could be used on TOA data to reveal the Pulse Repetition Intervals (PRIs) of radar pulse trains. In this approach the DFT is written as $$X(k) = \sum_{n_i} e^{\frac{-j2\pi n_i k}{N}} \quad (2)$$

where k represents the discrete frequency components, the $n_i$ are the individual Time-Of-Arrival (TOA) data values and N is the last TOA value collected. The values of k corresponding to the peaks of the modulus of the DFT represent the Pulse Repetition Frequency (PRF) (lowest peak k for a single pulse train) of the impulse train of TOA values and multiples of the PRF (harmonics of the lowest peak k).

In order to determine the AOA $\theta$, Eq. 2 must be calculated for data arriving at antenna #1 and antenna #2. In the following derivation the TOA values are represented as $$TOA_1(i) = \delta(n_i)$$

$$TOA_2(i) = \delta(n_i - mT)$$

where T is the resolution of the TOA clock and m = (0,1,2,...). Then the DFTs are $$X_1(k) = \sum_{n_i} e^{\frac{-j2\pi n_i k}{N}} \quad (4)$$

$$X_2(k) = \sum_{n_i} e^{\frac{-j2\pi(n_i + mT)}{N}} \quad (5)$$

$$= e^{\frac{-j2\pi kmT}{N}} \sum_{n_i} e^{\frac{-j2\pi k n_i}{N}}$$

From these equations we can see that the relative phase difference between equations 4 and 5 is $$\Delta\phi = \phi_1 - \phi_2 = \frac{2\pi kmT}{N} \quad (6)$$

Once the two spectra are generated from equations 4 and 5, the k value(s) corresponding to the PRF(s) can be found through methods presented in said Tsui, Shaw and Sharpin patent application. Therefore:

$$\Delta\phi_{peak} = \frac{2\pi k_{peak} mT}{N} \quad (7)$$

and the estimate for the TDOA is:

$$TDOA = \frac{\Delta\phi_{peak} N}{2\pi k} \quad (8)$$

The AOA can be solved by sustituting the TDOA estimate into equation 1 or $$\theta = \cos^{-1}\left[\frac{cTDOA}{d}\right] \quad (9)$$

Figure 3:
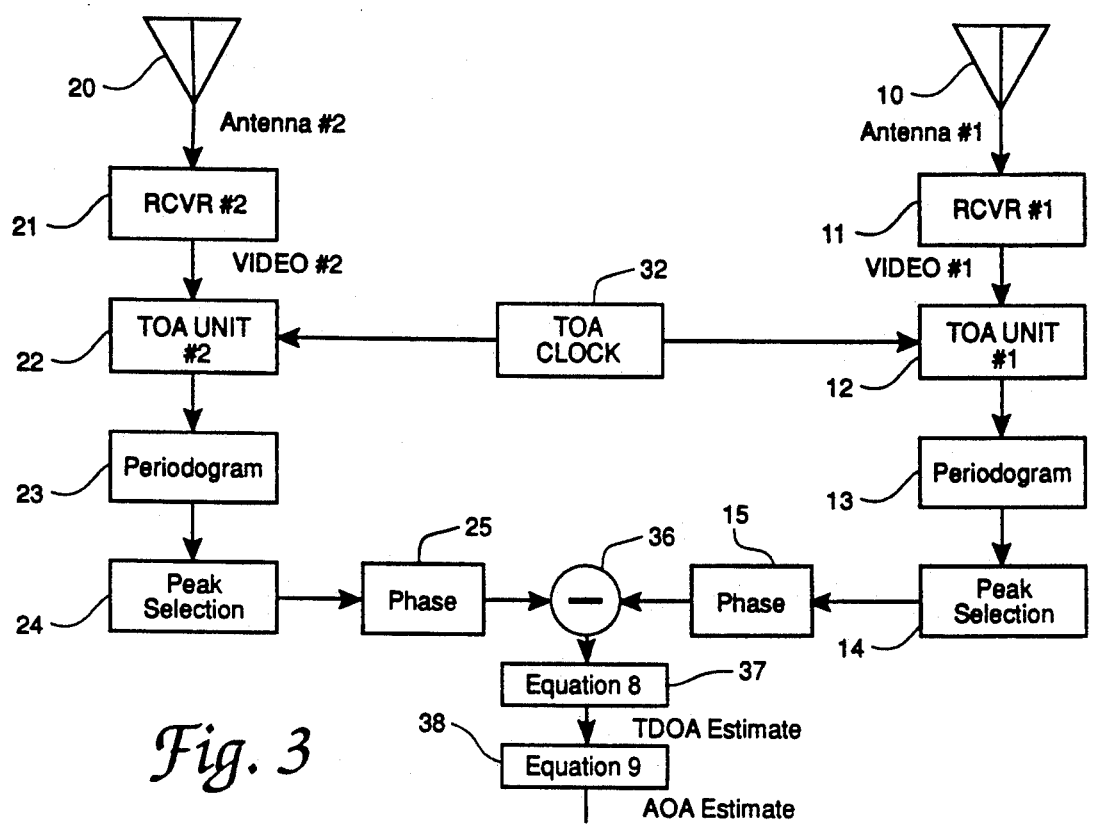
FIG. 3 is a block diagram showing a system according to the invention for processing a signal from two antennas to determine a AOA estimate.

A block diagram of the angle system hardware and algorithm structure is shown in FIG. 3. The first antenna 10 is coupled to a first Electronic Warfare Receiver 11, which provides a first video signal to a first TOA unit 12, where the time-of-arrival is time tagged. From the TOA unit 12, the signals are coupled to a periodgram unit 13, then to a peak selection unit 13, and then to a phase determination unit 15. Similarly, the second antenna 20 is coupled to a second Electronic Warfare Receiver 21, which provides a second video signal to a second TOA unit 22, where the time-of-arrival is time tagged. From the TOA unit 22, the signals are coupled to a periodgram unit 23, then to a peak selection unit 23, and then to a phase determination unit 25. A TOA clock 32 provides clock pulses to both TOA units 12 and 22. The phase determination units 15 and 25 are coupled to a difference unit 36 which takes the difference of the phase values. The output of unit 36 is used by means to perform equation 8 to obtain a TDOA estimate, and then by means to perform equation 9 to obtain the AOA estimate.

The units 12 and 22 provide the TOA pulse trains for the respective signals from the two antennas. The periodogram units 13 and 23 are used to calculate equations 4 and 5 for the respective pulse trains from the two antennas, units 14 and 24 perform peak detection, and the phase determination units 15 and 25 calculate equations 6 and 7.

Figure 4A:
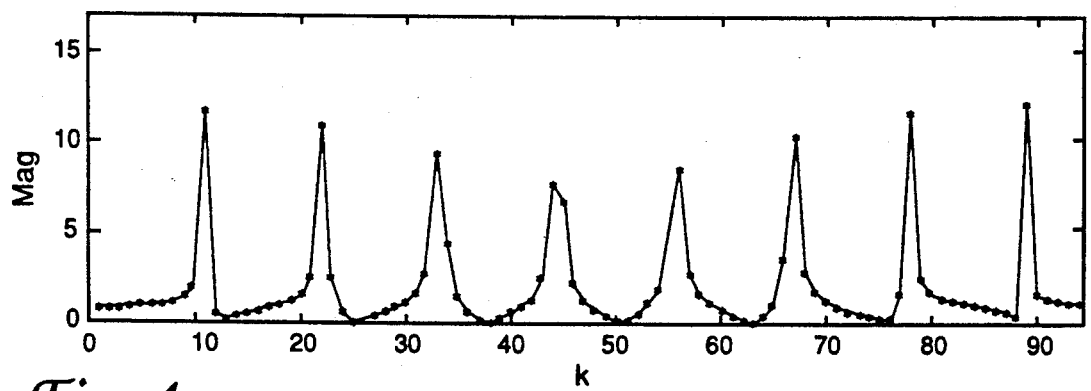
FIGS. 4a, 4b, 5a and 5b age graphs showing interleaved TOAs (undelayed in FIGS. 4a and 5a and delayed in FIGS. 4b and 5b)
Figure 4B:
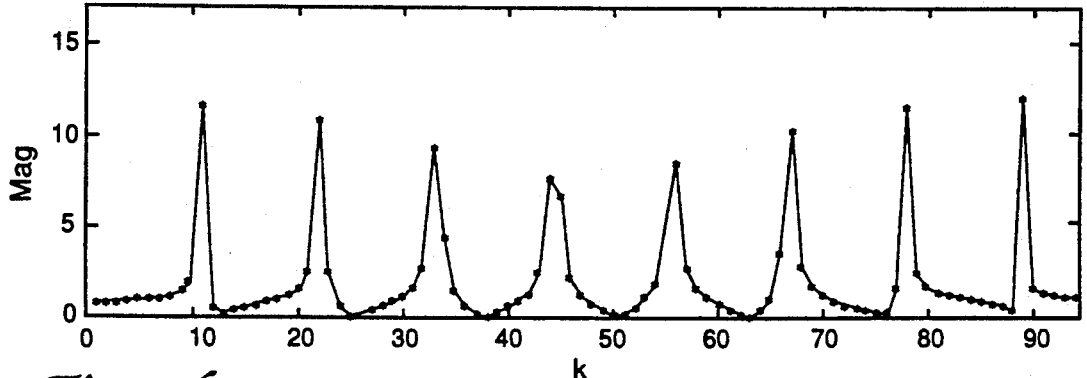

Computer Simulation: To illustrate the operation of the invention, two simple examples are shown. The computer simulation was written in MATLAB software. This software generated the TOA pulse trains, calculated equations 4 and 5, performed peak detection and calculated equations 6 and 7. In the first example only one TOA pulse train was genrerated with a PRI of 17. A replica of this pulse train delayed by 2 units was also generated. FIGS. 4a and 4b show the plots of the two spectra. The peak phase value at k=10 was used to calculate the TDOA estimate. This value was found to be equal to 2.

Figure 5A:
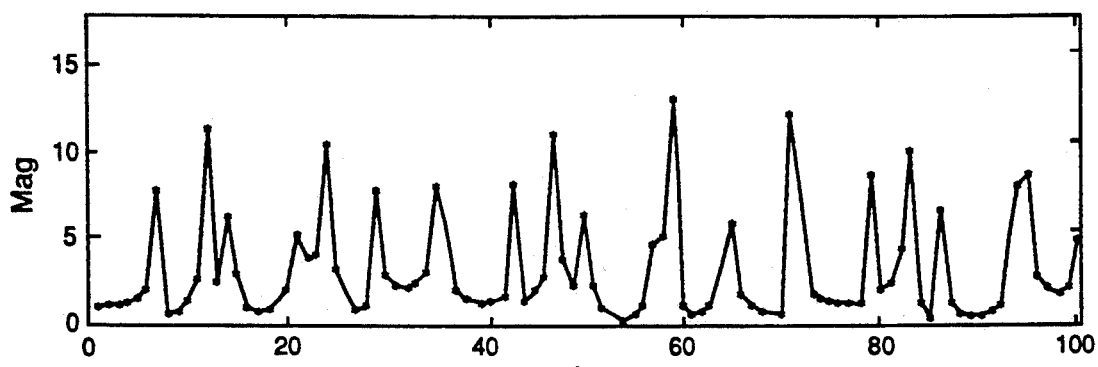
Figure 5B:
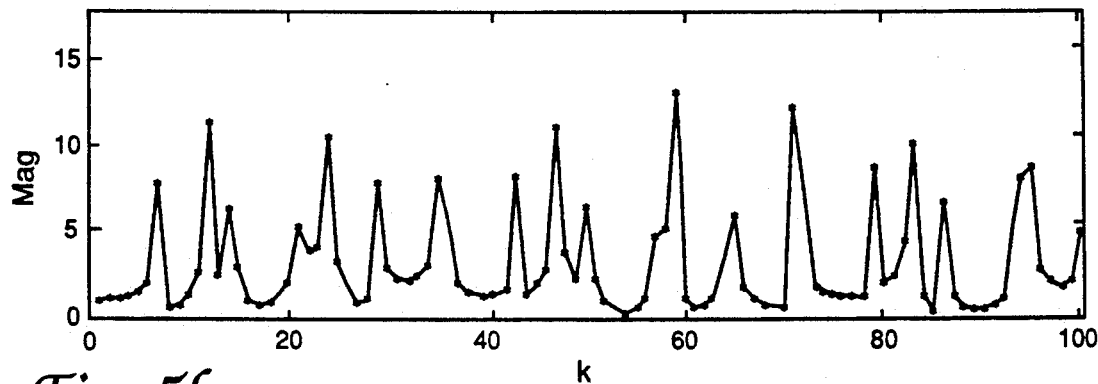
Figure 6A:
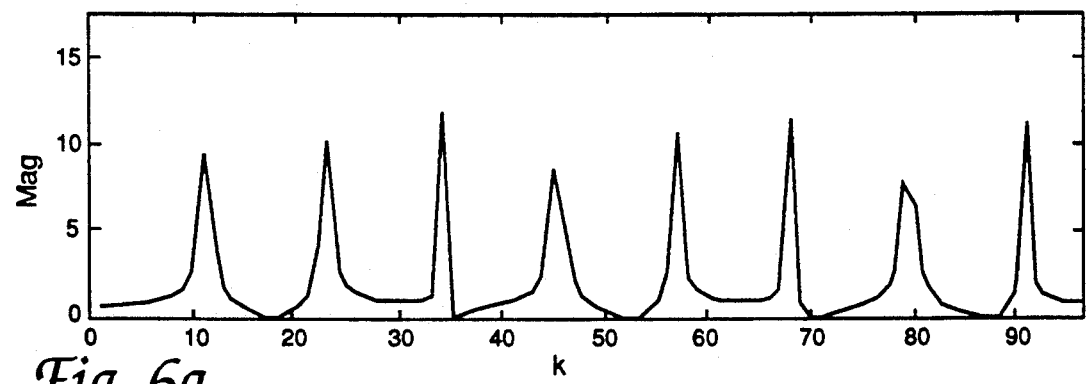
FIGS. 6a and 6b are graphs showing stripped TOA, undelayed in FIG. 6a and delayed in FIG. 6b.
Figure 6B:
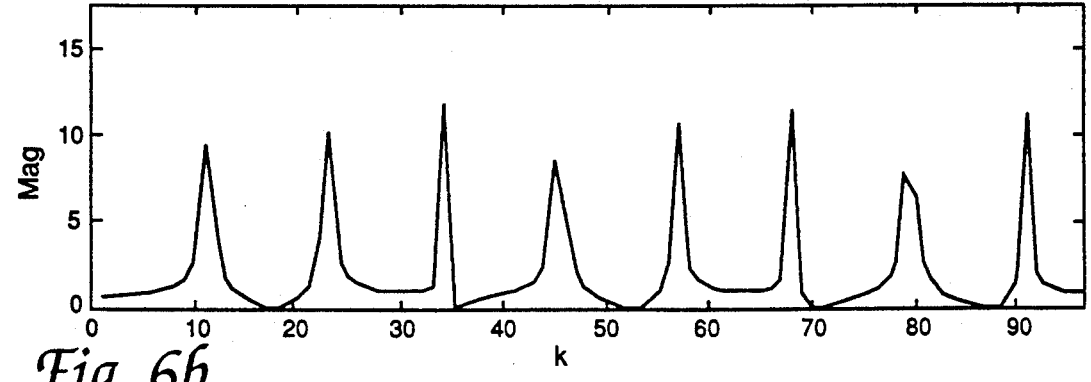

In the next example two pulse trains are interleaved in time. The first pulse train has a PRI of 28 and the second a PRI of 17. Both pulse trains were given a time delay of 5 (ie. from the same angle of arrival). FIGS. 5a and 5b show the interleaved spectra for the undelayed and delayed channels. The first peak k value represents the PRF of the first pulse train. This value was used to strip the first pulse train from the interleaved time domain TOA data. Equations 4 and 5 were again calculated for the stripped pulse train. FIG. 6 shows the resultant spectra. The first k value here corresponds to the PRF of the second pulse train. In both iterations the TDOA estimate was found to be equal to the actual value of 5.

Summary: This invention provides a method of estimating the angle-of-arrival of radar pulses with respect to a ground or airborne based platform by utilizing only two antennas and time-of-arrival data from the two aperatures. This invention can be used in a multiple signal environment to estimate the arrival angles of multiple emitting sources and uses a set of TOA measurements to obtain the TDOA estimate, therefore providing a data averaging process. Also, since the invention utilizes the spectral estimation technique from said prior Tsui, Shaw and Sharpin patent application, multiple emitters can be spatially very close, and if their PRIs are different, their arrival angles can be estimated.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A method to perform angle-of-arrival measurements (AOA) of radar signals using a first antenna and a second antenna separated by a distance d, wherein Time-Of-Arrival (TOA) values of the radar signals at the first and second antennas have been time tagged using Electronic Warfare (EW) receiver means and a TOA clock having a resolution T; the TOA values for the signals from the first and second antennas being represented respectively as $$TOA_1(i) = \delta(n_i)$$

$$TOA_2(i) = \delta(n_i - mT)$$

where k represents the discrete frequency components, the $n_i$ are the individual Time-Of-Arrival (TOA) data values and N is the last TOA value collected, and m $= (0,1,2,\ldots)$;

wherein said method comprises:

determining the Pulse Repetition Intervals using a Discrete Fourier Transform (DFT) $X_1(k)$ for signals from the first antenna and $X_2(k)$ for signals from the second antenna as $$X_1(k) = \sum_{n_i} e^{\frac{-j2\pi n_i k}{N}}$$

$$X_2(k) = \sum_{n_i} e^{\frac{-j2\pi(n_i + mT)k}{N}}$$

$$= e^{\frac{-j2\pi k mT}{N}} \sum_{n_i} e^{\frac{-j2\pi k n_i}{N}}$$

where k represents the discrete frequency components, the $n_i$ are the individual Time-Of-Arrival (TOA) data values and N is the last TOA value collected;

selecting peak values of k corresponding to the peaks of the modulus of the DFTs representing Pulse Repetition Frequency (PRF) for signals from the first and the second antennas;

taking the phase values $\phi_1$ and $\phi_2$ respectively from the DFTs for the signals from the two antennas as $$\phi_1 = \frac{2\pi n_i k}{N}$$

$$\phi_2 = \frac{2\pi k(n_i + mT)}{N}$$

determining the difference between the phase values $\phi_1$ and $\phi_2$ for a peak value of k as $$\Delta\phi_{peak} = \frac{2\pi k_{peak} mT}{N}$$

estimating a value for TDOA as:

$$TDOA = \frac{\Delta\phi_{peak} N}{2\pi k}$$

determining the angle-of-arrival AOA as $$\theta = \cos^{-1}\left[\frac{cTDOA}{d}\right].$$

* * * * *